(12) United States Patent
Matsuda

(10) Patent No.: US 8,022,589 B2
(45) Date of Patent: Sep. 20, 2011

(54) BRUSHLESS MOTOR

(75) Inventor: Masashi Matsuda, Kakegawa (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 176 days.

(21) Appl. No.: 12/585,170

(22) Filed: Sep. 8, 2009

(65) Prior Publication Data

US 2010/0066188 A1 Mar. 18, 2010

(30) Foreign Application Priority Data

Sep. 16, 2008 (JP) .................. 2008-236676

(51) Int. Cl.
*H02K 1/06* (2006.01)
(52) U.S. Cl. .................. 310/216.096; 310/179
(58) Field of Classification Search ........... 310/216.096, 310/179, 180, 156.01, 245.1
See application file for complete search history.

(56) References Cited

U.S. PATENT DOCUMENTS

| | | | | |
|---|---|---|---|---|
| 3,860,843 A | * | 1/1975 | Kawasaki et al. | 310/67 R |
| 3,978,356 A | * | 8/1976 | Spiesberger | 310/156.42 |
| 4,359,657 A | * | 11/1982 | Matsumoto et al. | 310/156.26 |
| 4,371,802 A | * | 2/1983 | Morrill | 310/166 |
| 4,782,272 A | * | 11/1988 | Buckley et al. | 318/400.01 |
| 4,845,411 A | * | 7/1989 | Smith | 318/400.41 |
| 4,874,975 A | * | 10/1989 | Hertrich | 310/186 |
| 4,882,511 A | * | 11/1989 | von der Heide | 310/67 R |
| 5,233,250 A | * | 8/1993 | De Filippis | 310/156.45 |
| 2001/0038249 A1 | * | 11/2001 | Ohnishi et al. | 310/49 R |
| 2002/0089243 A1 | * | 7/2002 | Isozaki et al. | 310/49 R |
| 2005/0168098 A1 | | 8/2005 | Takase et al. | |
| 2008/0073995 A1 | | 3/2008 | Niguchi et al. | |

* cited by examiner

*Primary Examiner* — Thanh Lam
(74) *Attorney, Agent, or Firm* — Posz Law Group, PLC

(57) ABSTRACT

Teeth of a stator core are arranged one after another in the circumferential direction at alternating first and second pitches. Each corresponding adjacent two of the teeth, which are spaced from each other by the first pitch, are wound with corresponding two, respectively, of stator coils, which form a corresponding common phase. Each corresponding adjacent two of the teeth, which are spaced from each other by the second pitch, are wound with corresponding two, respectively, of the stator coils, which form corresponding different phases, respectively.

9 Claims, 10 Drawing Sheets

BRUSHLESS MOTOR

CROSS REFERENCE TO RELATED APPLICATION

This application is based on and incorporates herein by reference Japanese Patent Application No. 2008-236676 filed on Sep. 16, 2008 and Japanese Patent Application No. 2009-181649 filed on Aug. 4, 2009.

BACKGROUND OF THE INVENTION

1. Field of the Invention

The present invention relates to a brushless motor.

2. Description of Related Art

Japanese Unexamined Patent Publication No. 2008-86064A (corresponding to US 2008/0073995A) recites a brushless motor known as a 10-pole/12-slot brushless motor. In this brushless motor, teeth of a stator core are arranged one after another at 30 degree pitches, i.e., intervals (360 degrees/12=30 degrees) in the circumferential direction of the brushless motor, and magnetic poles of rotor magnets are arranged one after another at 36 degree pitches, i.e., intervals (360 degrees/10=36 degrees) in the circumferential direction.

In the above-described brushless motor, a difference (specifically, a difference of 6 degrees measured as the central angle) exists between the pitch of the teeth measured in the circumferential direction of the brushless motor and the pitch of the magnetic poles of the rotor magnets measured in the circumferential direction of the brushless motor. This difference poses the following disadvantage.

Generally, in order to implement a relatively high effective magnetic flux amount and a relatively high motor efficiency in the motor, desirably, a phase difference $\Delta\theta$ (see FIG. 5) between the phase of the electric current I flowing through the stator coil wound around the corresponding tooth and the phase of the magnetic flux $\phi$ applied from the rotor magnet to the stator coil should be 90 degrees, as is well known according to Fleming's left-hand rule.

As discussed above, in the case of the brushless motor recited in Japanese Unexamined Patent Publication No. 2008-86064A, the difference (the difference of 6 degrees measured as the central angle) exists between the pitch of the teeth and the pitch of the magnetic poles of the rotor magnets. Therefore, the phase difference between the phase of the electric current flowing through the stator coil wound around the corresponding tooth and the phase of the magnetic flux applied from the rotor magnet to the stator coil becomes 75 degrees, which is smaller than 90 degrees. Thereby, the effective magnetic flux amount may be disadvantageously reduced to reduce the motor efficiency.

SUMMARY OF THE INVENTION

The present invention addresses the above disadvantage. According to the present invention, there is provided a brushless motor, which includes at least one rotor magnet, a stator core and a plurality of stator coils. The at least one rotor magnet forms a plurality of alternating N and S magnetic poles, which are alternately arranged one after another in a circumferential direction at generally equal pitches. The stator core includes a plurality of teeth, which are opposed to the at least one rotor magnet in a radial direction of the stator core and are arranged one after another in the circumferential direction at alternating first and second pitches that are alternately provided in the circumferential direction. The second pitch is smaller than the first pitch. The plurality of stator coils is wound around the plurality of teeth and forms a plurality of phases. Each corresponding adjacent two of the plurality of teeth, which are spaced from each other by the first pitch, are wound with corresponding two, respectively, of the plurality of stator coils, which form a corresponding common phase among the plurality of phases. Each corresponding adjacent two of the plurality of teeth, which are spaced from each other by the second pitch, are wound with corresponding two, respectively, of the plurality of stator coils, which form corresponding different phases, respectively, among the plurality of phases.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A first embodiment of the present invention will be described with reference to the accompanying drawings.

Figure 1:
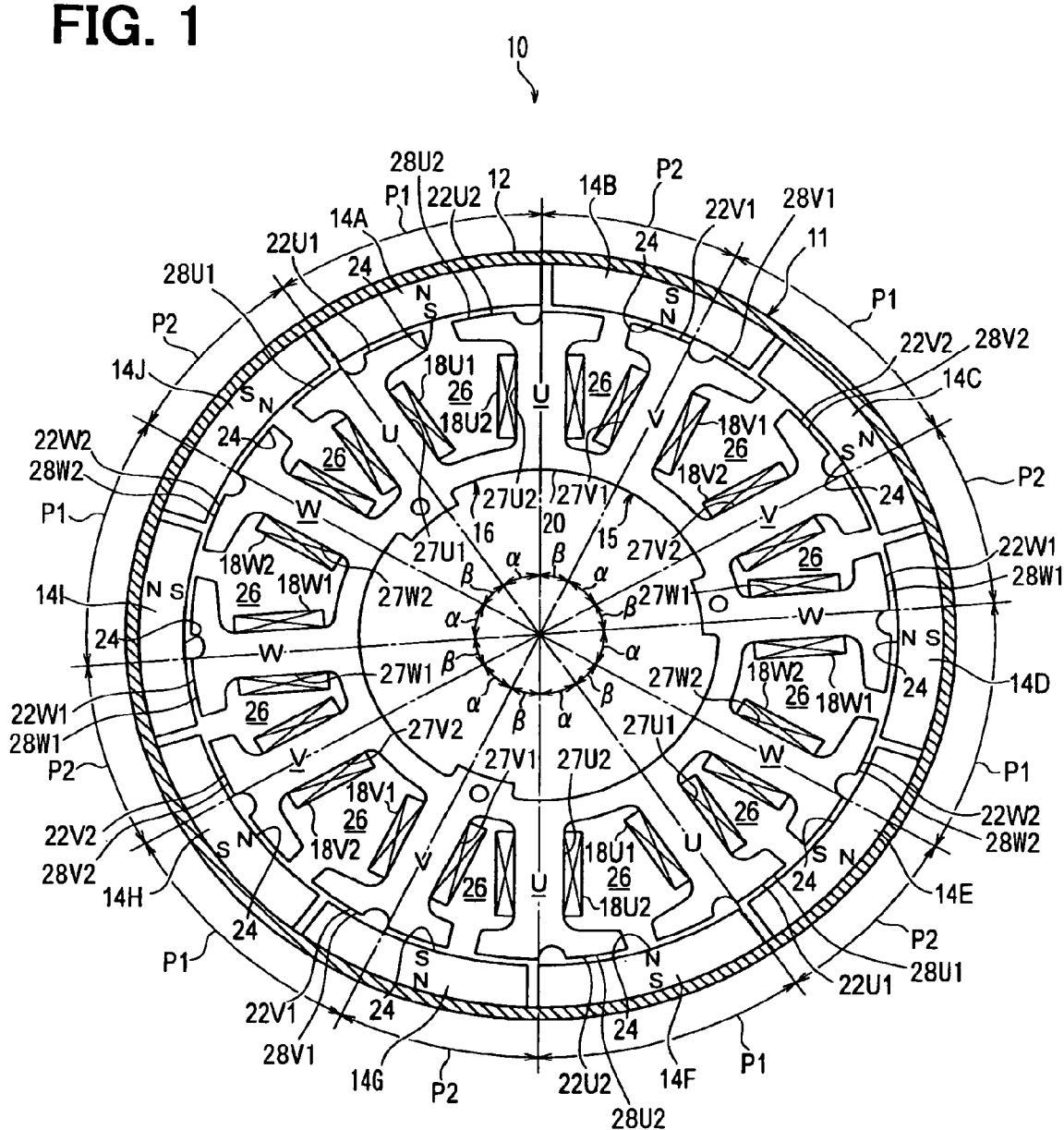
FIG. 1 is a cross sectional view of a brushless motor according to a first embodiment of the present invention.
Figure 2:
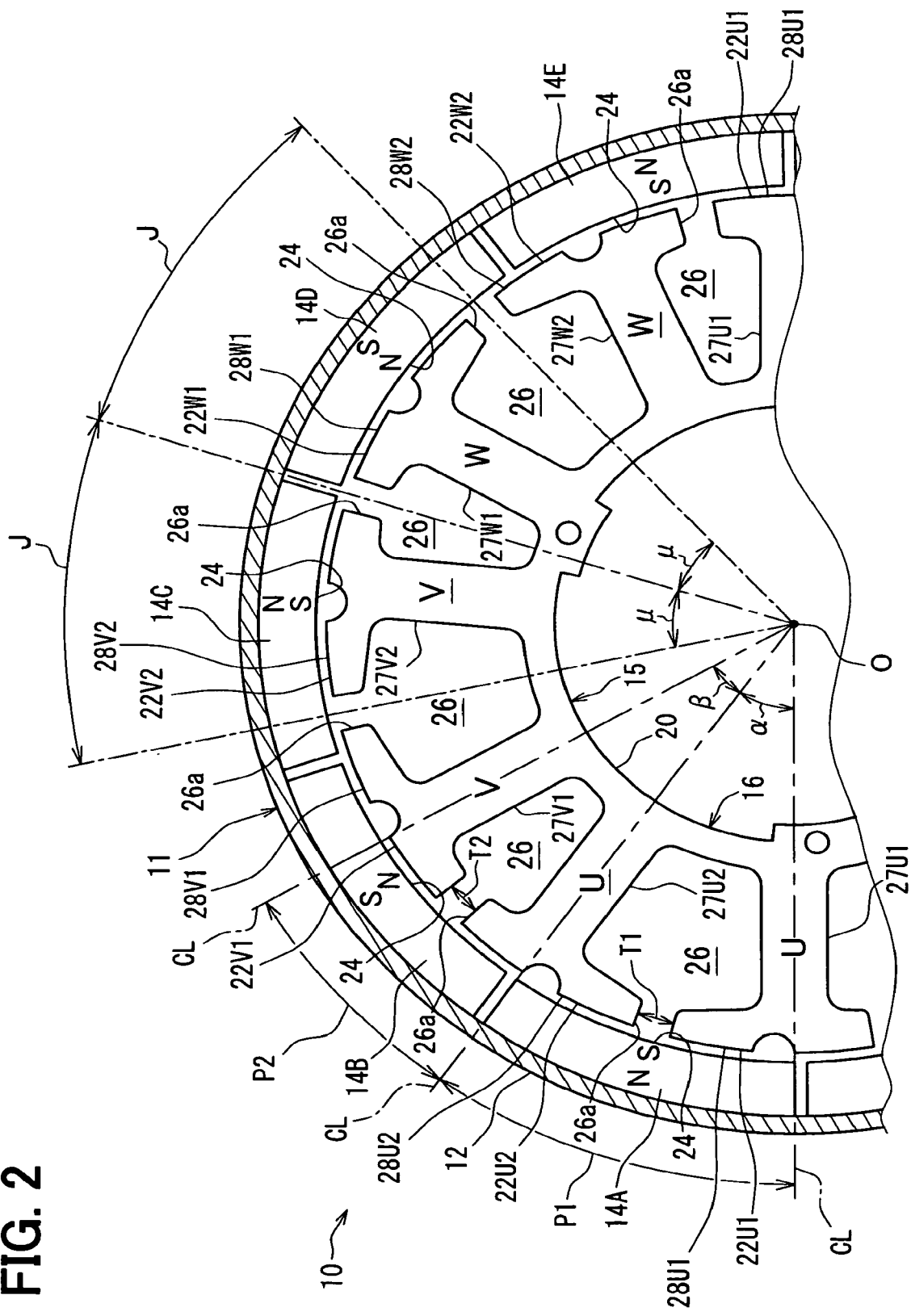
FIG. 2 is an enlarged partial cross-sectional view indicating a main feature shown in FIG. 1.

FIG. 1 is a cross-sectional view showing a cross section of a brushless motor 10 of the first embodiment along a plane that is perpendicular to an axial direction of the brushless motor 10. FIG. 2 is an enlarged partial view of the brushless motor 10 of FIG. 1 while eliminating stator coils 18U1-18W2 for the sake of simplicity. As shown in FIGS. 1 and 2, the brushless motor 10 includes a rotor 11 and a stator 15. The rotor 11 includes a rotor housing 12 and a plurality of rotor magnets 14A-14J. The stator 15 includes a stator core 16 and the stator coils 18U1-18W2.

Each of the rotor magnets 14A-14J is configured into an arcuate body, which is arcuate in a circumferential direction of the brushless motor 10. The rotor magnets 14A-14J are fixed to an inner peripheral surface of the rotor housing 12. The rotor magnets 14A-14J are generally identically configured and are arranged one after another at generally equal pitches, i.e., at generally equal angular intervals (circumferential intervals) in the circumferential direction of the brushless motor 10. Each rotor magnet 14A-14J is magnetized such that two different magnetic poles (N pole and S pole) are formed one after another in a radial direction of the brushless motor 10. Furthermore, the two different magnetic poles (N poles and S poles) of the rotor magnets 14A-14J are alternately arranged one after another in the circumferential direction of the brushless motor 10 at generally equal pitches. Here, instead of providing the multiple rotor magnets 14A-14J, it may be possible to provide a single arcuate or annular magnet, which is magnetized to form the two different magnetic poles (N poles and S poles) of the rotor magnets 14A-14J alternately arranged one after another in the circumferential direction of the brushless motor 10 at the generally equal pitches.

The stator core 16 includes an annular main body 20 and a plurality of teeth (twelve teeth in this instance) 22U1-22W2. The annular main body 20 is placed inward of the rotor magnets 14A-14J in the radial direction of the brushless motor 10 and is coaxial with the rotor magnets 14A-14J (i.e., coaxial with the inner peripheral surface of the rotor housing 12, to which the rotor magnets 14A-14J are fixed).

The teeth 22U1-22W2 radially extend from the annular main body 20 toward the rotor magnets 14A-14J (toward the radially outer side of the brushless motor 10) and are opposed to the rotor magnets 14A-14J in the radial direction. Furthermore, the teeth 22U1-22W2 are arranged one after another in the circumferential direction of the brushless motor 10 to have first pitches P1 and second pitches P2, which are alternately defined in the circumferential direction of the brushless motor 10 (specifically, six first pitches P1 and six second pitches P2 are alternately arranged in the circumferential direction). Here, each second pitch P2 is set to be smaller than each first pitch P1. Each of the teeth 22U1-22W2 includes a main body 27U1-27W2 and a head portion 28U1-28W2. The main body 27U1-27W2 of the tooth 22U1-22W2 radially extends from the annular main body 20 of the stator core 16, so that the main body 27U1-27W2 is radially elongated. The head portion 28U1-28W2 circumferentially extends from a radially outer end (radial distal end) of the main body 27U1-27W2 in both of the clockwise direction and the counterclockwise direction. In the present embodiment, each of the pitches P1, P2 is circumferentially defined as a corresponding angular interval (circumferential interval) between the center lines CL of the main bodies 27U1-27W2 of the corresponding adjacent two of the teeth 22U1-22W2. Here, the center line CL of the main body 27U1-27W2 of each tooth 22U1-22W2 extends through the circumferential center of the main body 27U1-27W2 of the tooth 22U1-22W2 over the length of the main body 27U1-27W2 along a corresponding imaginary radial line, which extends from the center O of the stator core 16 through the main body 27U1-27W2 in the radial direction of the stator core 16 and is completely overlapped with the center line CL in FIG. 2.

The stator coils 18U1-18W2 are wound around the main bodies 27U1-27W2 of the teeth 22U1-22W2, respectively. Among the stator coils 18U1-18W2, the stator coils 18U1, 18U2 form a U-phase, and the stator coils 18V1, 18V2 form a V-phase. Furthermore, the stator coils 18W1, 18W2 form a W-phase. Thereby, the brushless motor 10 is constructed as a three-phase brushless motor.

The stator coils 18U1, 18U2, which form the U-phase, are wound around the main bodies 27U1, 27U2 of the corresponding two teeth 22U1, 22U2 in opposite directions, respectively. That is, one of the stator coils 18U1, 18U2 is wound in one direction around the main body 27U1, 27U2 of the corresponding one of the teeth 22U1, 22U2, and the other one of the stator coils 18U1, 18U2 is wound in the other direction, which is opposite from the one direction, around the main body 27U1, 27U2 of the corresponding one of the teeth 22U1, 22U2. Similarly, the stator coils 18V1, 18V2, which form the V-phase, are wound around the main bodies 27V1, 27V2 of the corresponding two teeth 22V1, 22V2 in opposite directions, respectively. Also, the stator coils 18W1, 18W2, which form the W-phase, are wound around the main bodies 27W1, 27W2 of the corresponding two teeth 22W1, 22W2 in opposite directions, respectively.

Corresponding two of the stator coils 18U1-18W2, which are respectively wound around the corresponding adjacent two of the teeth 22U1-22W2 that are arranged adjacent to each other and are displaced (spaced) from each other by the first pitch P1, form the same common phase (i.e., the U-phase, the V-phase or the W-phase). Other corresponding two of the stator coils 18U1-18W2, which are respectively wound around the corresponding adjacent two of the teeth 22U1-22W2 that are arranged adjacent to each other and are displaced from each other by the second pitch P2, form the different phases, respectively.

This arrangement will be more specifically described. The stator coil 18U1 and the stator coil 18U2, which are respectively wound around the tooth 22U1 and the tooth 22U2 that are arranged adjacent to each other and are displaced from each other by the first pitch P1, form the same common phase, specifically the U-phase. The stator coil 18V1 and the stator coil 18V2, which are respectively wound around the tooth 22V1 and the tooth 22V2 that are arranged adjacent to each other and are displaced from each other by the first pitch P1, form the same common phase, specifically the V-phase. Furthermore, the stator coil 18W1 and the stator coil 18W2, which are respectively wound around the tooth 22W1 and the tooth 22W2 that are arranged adjacent to each other and are displaced from each other by the first pitch P1, form the same common phase, specifically the W-phase.

In contrast, the stator coil 18U2 and the stator coil 18V1, which are respectively wound around the tooth 22U2 and the tooth 22V1 that are arranged adjacent to each other and are displaced from each other by the second pitch P2, form the different phases, specifically the U-phase and the V-phase, respectively. Also, the stator coil 18V2 and the stator coil 18W1, which are respectively wound around the tooth 22V2 and the tooth 22W1 that are arranged adjacent to each other and are displaced from each other by the second pitch P2, form the different phases, specifically the V-phase and the W-phase, respectively. Furthermore, the stator coil 18W2 and the stator coil 18U1, which are respectively wound around the tooth 22W2 and the tooth 22U1 that are arranged adjacent to each other and are displaced from each other by the second pitch P2, form the different phases, specifically the W-phase and the U-phase, respectively.

Furthermore, in the brushless motor 10, the total number of the magnetic poles 24 of the rotor magnets 14A-14J arranged one after another in the circumferential direction of the brushless motor 10 is ten. Also, the total number of the slots 26, each of which is defined between the corresponding two of the teeth 22U1-22W2 in the circumferential direction of the brushless motor 10, is twelve. Thereby, the brushless motor 10 has the ten poles and twelve slots, i.e., is a 10-pole/12-slot brushless motor.

Furthermore, the angle (central angle) $\alpha$ of the first pitch P1 about the center O of the stator core 16 satisfies a relationship of 360 degrees/n<$\alpha$≦360 degrees/m, where "m" denotes the number of the magnetic poles 24, and "n" denotes the number of the slots 26. Furthermore, the angle $\alpha$ of the first pitch P1 about the center O of the stator core 16 and the angle (central angle) β of the second pitch P2 about the center O of the stator core 16 satisfy a relationship of α+β=(360 degrees/n)×2.

That is, the central angle α of the first pitch P1 about the center O of the stator core 16 is in a range of 30 degrees<α≦36 degrees, and the central angle β of the second pitch P2 about the center O of the stator core 16 is in a range of 30 degrees>β≧24 degrees.

Next, the operation and advantages of the brushless motor 10 of the first embodiment will be described.

In the brushless motor 10 of the first embodiment, i.e., in the 10-pole/12-slot brushless motor constructed in the above described manner, the angle α of the first pitch P1 of the teeth 22U1-22W2 about the center O of the stator core 16 satisfies the relationship of 360 degrees/n<α≦360 degrees/m. Furthermore, the angle α of the first pitch P1 of the corresponding ones of the teeth 22U1-22W2 about the center O of the stator core 16 and the angle β of the second pitch P2 of the other corresponding ones of the teeth 22U1-22W2 about the center O of the stator core 16 satisfy the relationship of α+β=(360 degrees/n)×2.

That is, the central angle α of the first pitch P1 about the center O of the stator core 16 is in the range of 30 degrees<α≦36 degrees, and the central angle β of the second pitch P2 about the center O of the stator core 16 is in the range of 30 degrees>β≧24 degrees.

Figure 3:
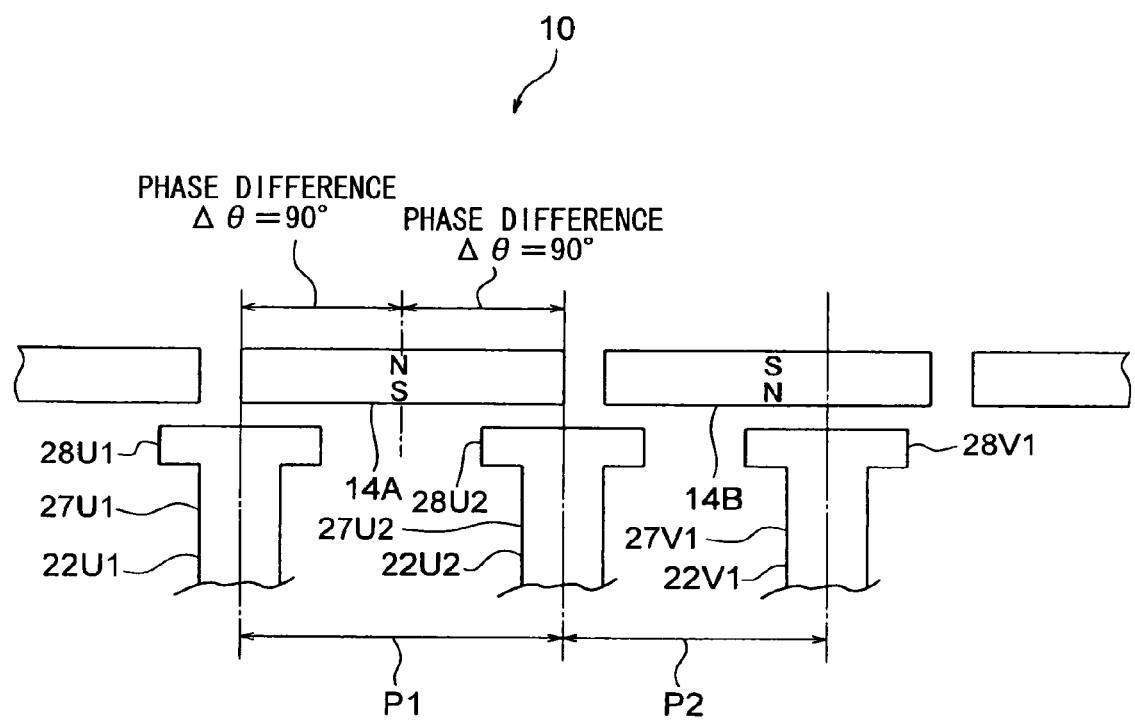
FIG. 3 is a diagram showing a positional relationship between rotor magnets and teeth of the brushless motor shown in FIG. 1.
Figure 5:
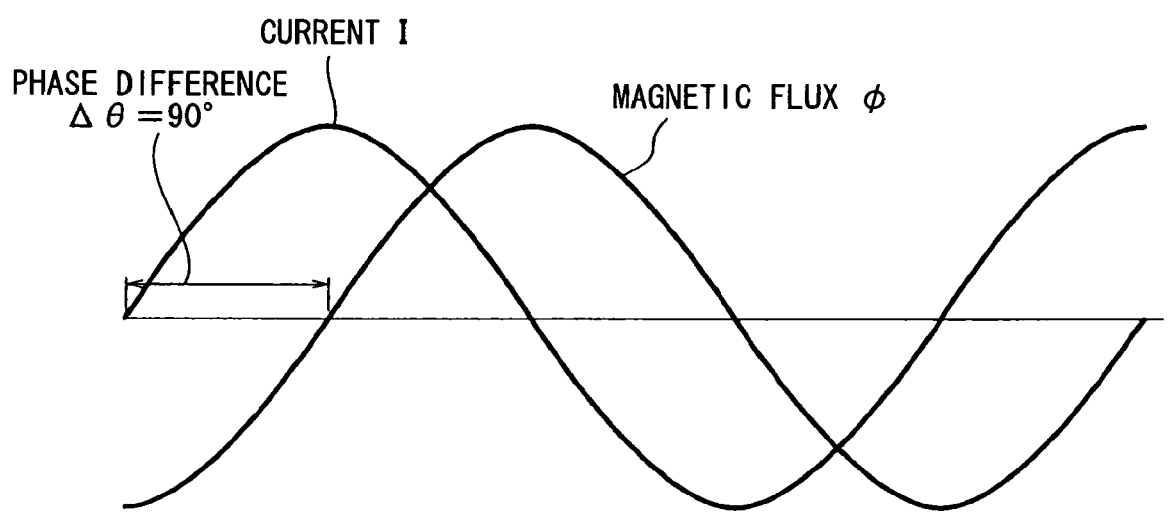
FIG. 5 is a diagram showing a relationship between a phase of an electric current flowing through stator coils and a phase of a magnetic flux applied to the stator coils.
Figure 10:
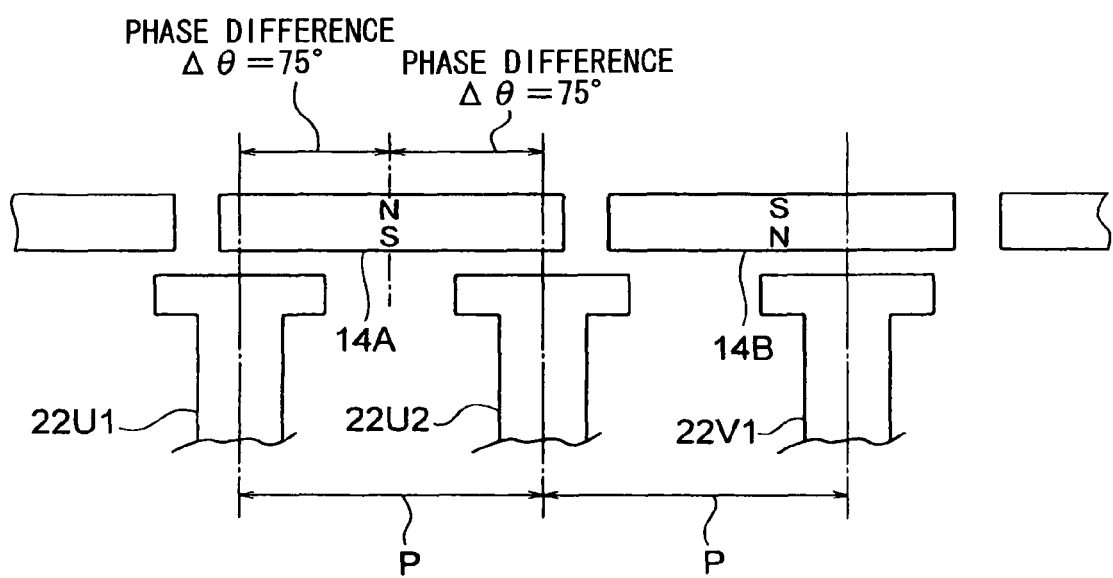
FIG. 10 is a diagram showing a positional relationship between rotor magnets and teeth of a previously proposed brushless motor, in which a phase difference between a phase of an electric current flowing through stator coils and a phase of a magnetic flux applied to the stator coils is 75 degrees.

Therefore, the phase difference Δθ (see FIGS. 3 and 5) between the phase of the electric current I, which flows through the stator coils 18U1-18W2 wound around the teeth 22U1-22W2, and the phase of the magnetic flux φ, which is applied from the rotor magnets 14A-14J to the stator coils 18U1-18W2, becomes equal to or closer to 90 degrees in comparison to the case where all of the teeth 22U1-22W2 are arranged one after another at the equal pitches P in the circumferential direction (i.e., the case where the angle α and the angle β are constant and are set to be 30 degrees, and the phase difference Δθ is 75 degrees, as shown in FIG. 10). As a result, the relatively high effective magnetic flux amount can be achieved, and thereby the relatively high motor efficiency can be achieved.

In the case of the 10-pole/12-slot brushless motor where the central angle α of the first pitch is 36 degrees, the phase difference Δθ (see FIGS. 3 and 5) between the phase of the electric current I, which flows through the stator coils 18U1-18W2 wound around the teeth 22U1-22W2, and the phase of the magnetic flux φ, which is applied from the rotor magnets 14A-14J to the stator coils 18U1-18W2, becomes 90 degrees. Therefore, it is possible to improve the motor efficiency.

Furthermore, in the present embodiment, as indicated in FIG. 2, a circumferential distance (a circumferential size of an inlet 26a of the slot 26) T1 between the head portions 28U1-28W2 of the adjacent two of the teeth 22U1-22W2, which belong to the same common phase, is equal to a circumferential distance (a circumferential size of an inlet 26a of the slot 26) T2 between the head portions 28U1-28W2 of the adjacent two of the teeth 22U1-22W2, which belong to the different phases, respectively. That is, the inlets 26a of all of the slots 26 have the same circumferential size. Furthermore, circumferential centers of the inlets 26a of the slots 26 are circumferentially arranged one after another at generally equal intervals J (central angles μ). In this way, at the time of winding the stator coils 18U1-18W2 with the winding machine, the stator core 16 can be simply rotated at the constant rotational angle every time the winding of the stator coil 22U1-22W2 at the one slot 26 is completed to proceed with the next winding operation at the next slot 26 regardless of the unequal pitches P1, P2. Also, since the circumferential size (the circumferential distances T1, T2) of each slot 26 is constant, the stator coils 18U1-18W2 can be easily inserted into the interior of the slot 26 without requiring the extra positional adjustment of the winding machine relative to the slot 26.

Second Embodiment

Next, a second embodiment of the present invention will be described.

Figure 4:
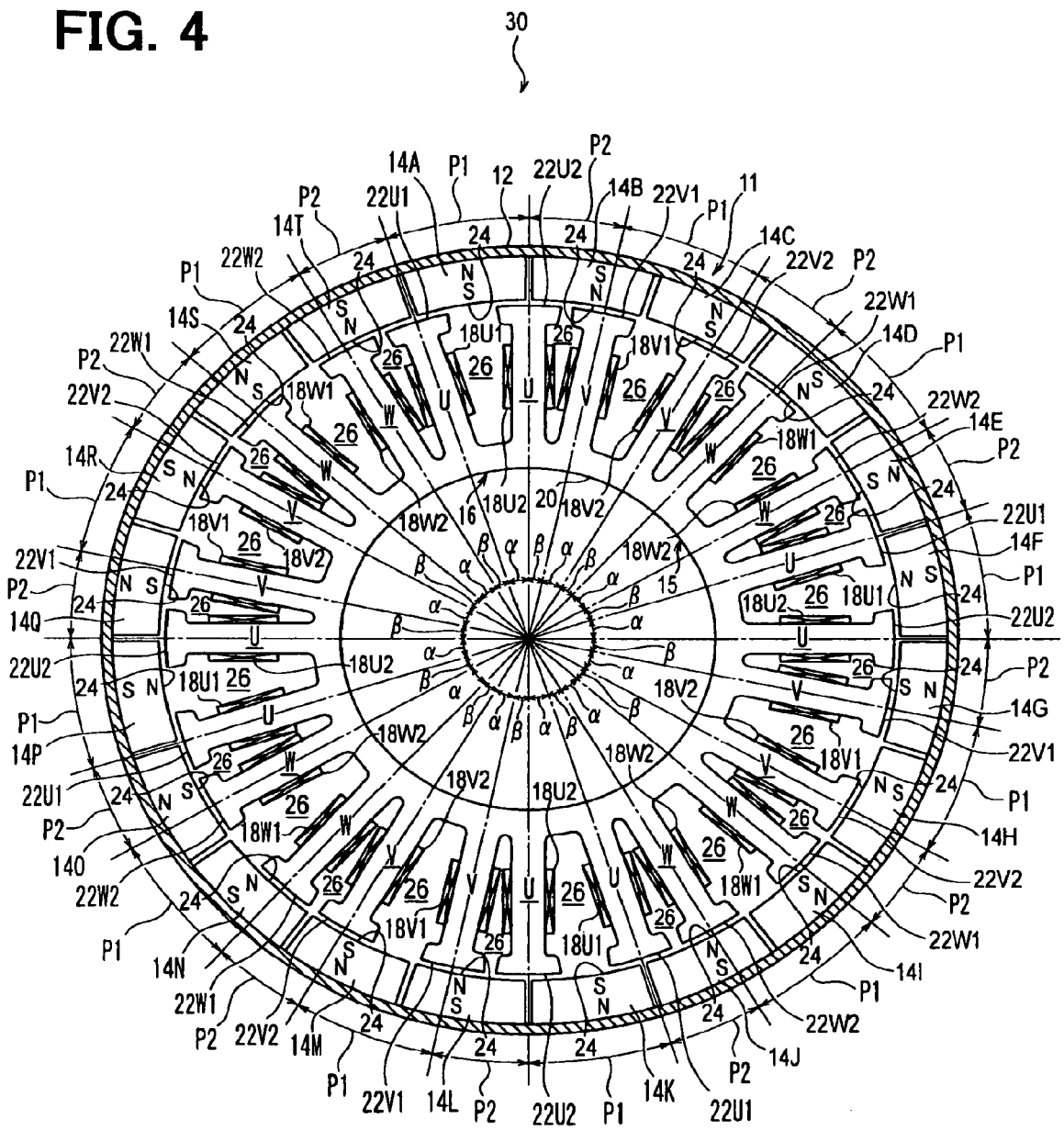
FIG. 4 is a cross sectional view of a brushless motor according to a second embodiment of the present invention.

FIG. 4 is a cross-sectional view showing a cross section of a brushless motor 30 of the second embodiment along a plane that is perpendicular to an axial direction of the brushless motor 30.

The brushless motor 30 of the second embodiment is similar to the brushless motor 10 of the first embodiment except that the number of the magnetic poles 24 of the rotor magnets 14A-14T arranged one after another in the circumferential direction is twenty, and the number of the slots 26, each of which is defined between the corresponding two of the teeth 22U1-22W2 in the circumferential direction, is twenty four. Thereby, the brushless motor 30 has the twenty poles and twenty four slots, i.e., is the 20-pole/24-slot brushless motor.

Furthermore, the central angle α of the first pitch P1 about the center O of the stator core 16 is in a range of 15 degrees<α≦18 degrees, and the central angle β of the second pitch P2 about the center O of the stator core 16 is in a range of 15 degrees>β≧12 degrees.

Even in the case of the above construction, the phase difference Δθ between the phase of the electric current I, which flows through the stator coils 18U1-18W2 wound around the teeth 22U1-22W2, and the phase of the magnetic flux φ, which is applied from the rotor magnets 14A-14T to the stator coils 18U1-18W2, becomes equal to or closer to 90 degrees in comparison to the case where all of the teeth 22U1-22W2 are arranged one after another at the equal pitches P in the circumferential direction (i.e., in the case where the angle α and the angle β are constant and are set to be 15 degrees, and the phase difference Δθ is 75 degrees, as shown in FIG. 10). As a result, according to the present embodiment, the relatively high effective magnetic flux amount can be achieved, and thereby the relatively high motor efficiency can be achieved.

In the case where the central angle α of the first pitch is 18 degrees, the phase difference Δθ between the phase of the electric current I, which flows through the stator coils 18U1-18W2 wound around the teeth 22U1-22W2, and the phase of the magnetic flux φ, which is applied from the rotor magnets 14A-14T to the stator coils 18U1-18W2, becomes 90 degrees. Therefore, it is possible to improve the motor efficiency.

Furthermore, it should be noted that although the shapes of the head portions of the teeth 22U1-22W2 of the brushless motor 30 of the second embodiment are different from those of the teeth 22U1-22W2 of the brushless motor 10 of the first embodiment, it is possible to change the shapes of the head portions of the teeth 22U1-22W2 of the brushless motor 30 of the second embodiment in the manner similar to those of the teeth 22U1-22W2 of the brushless motor 10 of the first embodiment to implement the advantages similar to those discussed with the first embodiment. Alternatively, the shapes of the head portions of the teeth 22U1-22W2 of the brushless motor 10 of the first embodiment may be changed in the manner similar to those of the teeth 22U1-22W2 of the brushless motor 30 of the second embodiment. Even in the case of the second embodiment, the advantages of achieving the phase difference Δθ equal to or closer to 90 degrees can be achieved.

Third Embodiment

Next, a third embodiment of the present invention will be described.

Figure 6:
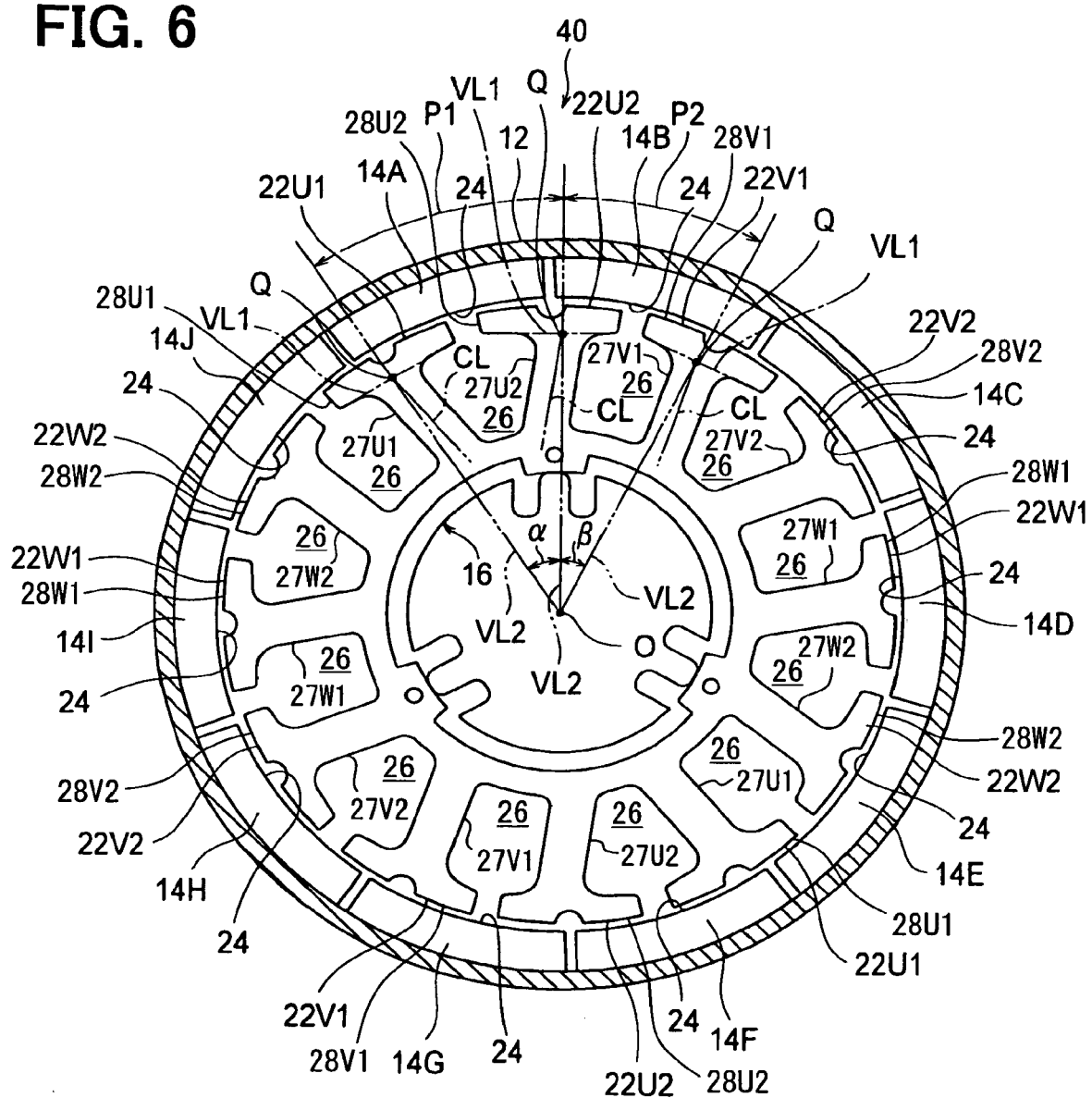
FIG. 6 is a cross sectional view of a brushless motor according to a third embodiment of the present invention.
Figure 7:
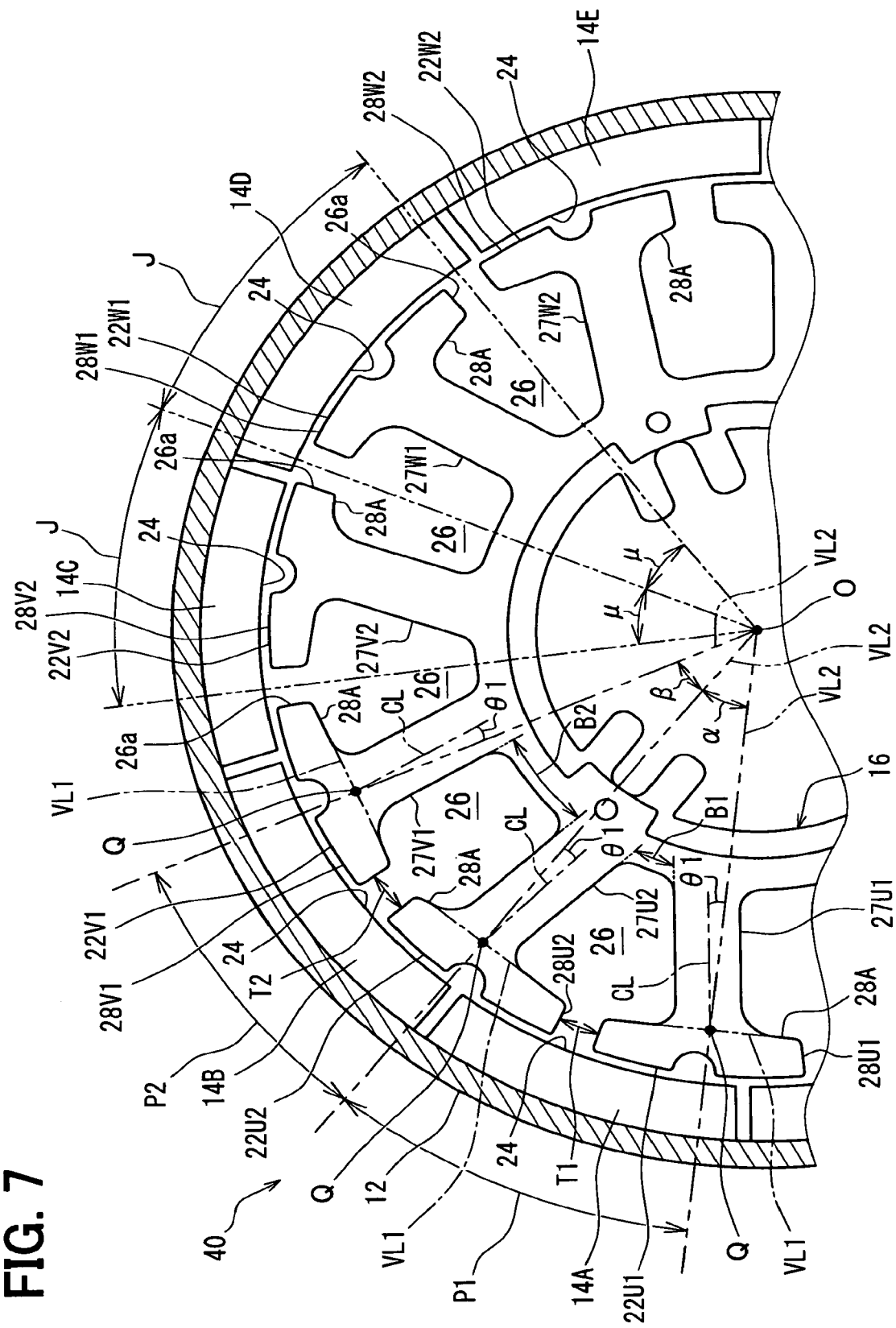
FIG. 7 is an enlarged partial cross-sectional view indicating a main feature shown in FIG. 6.

FIG. 6 is a cross-sectional view showing a cross section of a brushless motor 40 of the third embodiment along a plane that is perpendicular to an axial direction of the brushless motor 40. FIG. 7 is an enlarged partial cross-sectional view indicating a main feature of the brushless motor shown in FIG. 6.

In FIGS. 6 and 7, the stator coils 18U1-18W2 wound around the teeth 22U1-22W2 are omitted for the sake of simplicity. However, it should be noted that these stator coils 18U1-18W2 are arranged around the teeth 22U1-22W2 in a manner similar to the stator coils 18U1-18W2 shown in FIG. 1.

The brushless motor 40 of the third embodiment is similar to the brushless motor 10 of the first embodiment except the following points.

That is, each of the teeth 22U1-22W2 is tilted relative to the radial direction of the stator core 16. This feature will be described with reference to FIG. 7. In the present embodiment, unlike the first and second embodiments, a center line CL of the main body 27U1-27W2 of each of the teeth 22U1-22W2, which extends through a circumferential center of the main body 27U1-27W2 over a length of the main body 27U1-27W2, is angled relative to a corresponding imaginary radial line (more specifically, a second imaginary line VL2 described below), which extends from the center O of the stator core 16 through the main body 27U1-27W2 in the radial direction of the stator core 16. That is, the center line CL of the main body 27U1-27W2 is tilted relative to the corresponding radial direction at the corresponding angle. Furthermore, in each of the teeth 22U1-22W2, a radially inner peripheral surface (radially inner circumferential surface) 28A of the head portion 28U1-28W2 of the tooth 22U1-22W2 extends generally along a first imaginary line VL1 that is generally perpendicular to the second imaginary line VL2, which extends from the center O of the stator core 16 in the radial direction of the stator core 16 and intersects with the first imaginary line VL1 at an intersection point Q at the right angle (90 degrees). Furthermore, the center line CL of the main body 27U1-27W2 of the tooth 22U1-22W2 intersects with the first imaginary line VL1 and the second imaginary line VL2 of the tooth 22U1-22W2 at the intersection point Q.

In the present embodiment, unlike the first and second embodiments, the pitch P1 is defined as an angular interval (circumferential interval) between the intersection points Q of the adjacent two of the teeth 22U1-22W2, which belong to the same common phase (the U-phase, the V-phase or the W-phase). In each of these adjacent two of the teeth 22U1-22W2, which belong to the same common phase and are spaced from each other by the pitch P1, the center line CL of the main body 27U1-27W2 of the tooth 22U1-22W2 is tilted relative to the second imaginary line VL2 of the tooth 22U1-22W2 toward the other one of the adjacent two of the teeth 22U1-22W2 at the location radially inward of the intersection point Q of the tooth 22U1-22W2. In other words, at the location radially inward of the intersection points Q of the adjacent two of the teeth 22U1-22W2, which belong to the same common phase, the center lines CL of the main bodies 27U1-27W2 of these adjacent two of the teeth 22U1-22W2 are circumferentially located in the circumferential region defined between the second imaginary lines VL2 of these adjacent two of the teeth 22U1-22W2.

The pitch P2 is defined as an angular interval (circumferential interval) between the intersection points Q of the other adjacent two of the teeth 22U1-22W2, which belong to the different phases, respectively. In each of these adjacent two of the teeth 22U1-22W2, which belong to the different phases, respectively, and are spaced from each other by the pitch P2, the center line CL of the main body 27U1-27W2 of the tooth 22U1-22W2 is tilted relative to the second imaginary line VL2 of the tooth 22U1-22W2 away from the other one of the adjacent two of the teeth 22U1-22W2 at the location radially inward of the intersection point Q of the tooth 22U1-22W2. In other words, at the location radially inward of the intersection points Q of the adjacent two of the teeth 22U1-22W2, which belong to the different phases, respectively, the center lines CL of the main bodies 27U1-27W2 of these adjacent two of the teeth 22U1-22W2 are circumferentially located out of the circumferential region defined between the second imaginary lines VL2 of these adjacent two of the teeth 22U1-22W2.

Furthermore, as discussed above, since the center lines CL of the main bodies 27U1-27W2 of the adjacent two of the teeth 22U1-22W2, which belong to the different phases, respectively, are circumferentially located out of the circumferential region defined between the second imaginary lines VL2 of these adjacent two of the teeth 22U1-22W2, a circumferential extent B2 of a radially inner bottom of the slot 26, which is defined between the corresponding adjacent two teeth 22U1-22W2 spaced from each other by the second pitch P2, is larger than a circumferential extent B1 of a radially inner bottom of the slot 26, which is defined between the corresponding adjacent two teeth 22U1-22W2 spaced from each other by the first pitch P1. In other words, a circumferential distance (circumferential extent B2) between the radially inner base end portions of the main bodies 27U1-27W2 of these adjacent two of the teeth 22U1-22W2 is larger than a circumferential distance (circumferential extent B1) between the radially inner base end portions of the main bodies 27U1-27W2 of the other adjacent two of the teeth 22U1-22W2, which belong to the same common phase. The circumferential extent B2 is also increased relative to the corresponding circumferential extent of the first embodiment (see the circumferential distance between, for example, the radially inner base end portion of the main body 27V2 of the tooth 22V2 and the radially inner base end portion of the main body 27W1 of the tooth 22W1 shown in FIG. 2).

Thereby, in the brushless motor 40, it is possible to provide the sufficient size (particularly, the size of the radially inner bottom of the slot 26, i.e., the circumferential extent B2) of the slot 26 between the adjacent two of the teeth 22U1-22W2, which belong to the difference phases, respectively, and are spaced from each other by the second pitch P2 that is smaller than the first pitch P1. As a result, the space factor of the stator coils 18U1, 18V1, 18W1, which are respectively wound around the teeth 22U1, 22V1, 22W1, can be advantageously improved. In other words, it is possible to increase the number of turns of the stator coils 18U1, 18V1, 18W1 around the teeth 22U1, 22V1, 22W2 in comparison to the first embodiment because of the increased size (the circumferential extent B2) of the radially inner bottom of the corresponding slots 26.

Also, in this way, the space factor of each of the stator coils 18U1, 18V1, 18W1, which are respectively wound around the teeth 22U1, 22V1, 22W1, can become generally equal to the space factor of each of the stator coils 18U2, 18V2, 18W2, which are respectively wound around the teeth 22U2, 22V2, 22W2. In the present instance, with reference to FIG. 7, an angle θ1 between the second imaginary line VL2 and the center line CL at each tooth 22U1-22W2 is preferably set to be in a range of 0 degrees<θ1≦18 degrees. More preferably, the angle θ1 is set to be about 15 degrees in this instance, so that the circumferential space between each adjacent two of the coils 18U1-18W2 wound around the teeth 22U1-22W2 becomes constant.

In addition, in the case where the angle α between the second imaginary lines VL2 of the adjacent two of the teeth 22U1-22W2, which are spaced from each other by the first pitch P1, is in the range of 360 degrees/n<α≦360 degrees/m where "n" denotes the number of the slots 26, and "m" denotes the number of the magnetic poles 24. Furthermore, this angle α and the angle β between the second imaginary lines VL2 of the adjacent two of the teeth 22U1-22W2, which are spaced from each other by the second pitch P2, satisfy a relationship of α+β=(360 degrees/n)×2.

That is, in the brushless motor 40 of the present embodiment, the relationship between the number of the magnetic poles 24 of the rotor magnets 14A-14J, which are arranged one after another in the circumferential direction, is ten, and the number of the slots 26, each of which is defined between the adjacent two of the teeth 22U1-22W2, is twelve. Therefore, the brushless motor 40 is formed as the 10-pole/12-slot brushless motor. Thereby, the angle α is in the range of 30 degrees<α≦36 degrees, and the angle β is in the range of 30 degrees>β≧24 degrees.

Even with this construction, the phase difference Δθ (see FIGS. 3 and 5) between the phase of the electric current I, which flows through the stator coils 18U1-18W2 wound around the teeth 22U1-22W2, and the phase of the magnetic flux φ, which is applied from the rotor magnets 14A-14J to the stator coils 18U1-18W2, becomes equal to or closer to 90 degrees in comparison to the case where all of the teeth 22U1-22W2 are arranged one after another at the equal pitches P in the circumferential direction (i.e., in the case where the angle α and the angle β are constant and are set to be 30 degrees, and the phase difference Δθ is 75 degrees, as shown in FIG. 10). As a result, the relatively high effective magnetic flux amount can be achieved, and thereby the relatively high motor efficiency can be achieved.

In the case of the 10-pole/12-slot brushless motor where the central angle α of the first pitch P1 is 36 degrees, the phase difference Δθ between the phase of the electric current I, which flows through the stator coils 18U1-18W2 wound around the teeth 22U1-22W2, and the phase of the magnetic flux φ, which is applied from the rotor magnets 14A-14J to the stator coils 18U1-18W2, becomes 90 degrees. Therefore, it is possible to improve the motor efficiency.

In the present embodiment, the teeth 22U1-22W2 are tilted such that the center line CL of the main body 27U1-27W2 is tilted relative to the second imaginary line VL2. Furthermore, the angle α is set to satisfy the relationship of 360 degrees/n<α≦360 degrees/m, and the angle α and the angle β satisfy the relationship of α+β=(360 degrees/n)×2. The above concept can be applied to the case where each of the teeth 22U1-22W2 does not tilt, so that the center line CL of each of the teeth 22U1-22W2 may extend through the center O of the stator core 16, and the center line CL and the second imaginary line VL2 may coincide with each other.

Furthermore, in the present embodiment, as indicated in FIG. 7, a circumferential distance (a circumferential size of the inlet 26a of the slot 26) T1 between the head portions 28U1-28W2 of the adjacent two of the teeth 22U1-22W2, which belong to the same common phase, is equal to a circumferential distance (a circumferential size of the inlet 26a of the slot 26) T2 between the head portions 28U1-28W2 of the adjacent two of the teeth 22U1-22W2, which belong to the different phases, respectively. Furthermore, circumferential centers of the inlets 26a of the slots 26 are circumferentially arranged one after another at the generally equal intervals J (the central angles μ). In this way, similar to the first embodiment, at the time of winding the stator coils 18U1-18W2 with the winding machine, the stator core 16 can be simply rotated at the constant rotational angle every time the winding of the stator coil 22U1-22W2 at the one slot 26 is completed to proceed with the next winding operation at the next slot 26 regardless of the unequal pitches P1, P2. Also, since the circumferential size (the circumferential distances T1, T2) of each slot 26 is constant, the stator coils 18U1-18W2 can be easily inserted into the interior of the slot 26 without requiring the extra positional adjustment of the winding machine relative to the slot 26.

In the present embodiment, the radially inner peripheral surface 28A of the head portion 28U1-28W2 of each tooth 22U1-22W2 extends generally along the first imaginary line VL1 that is generally perpendicular to the second imaginary line VL2. Alternatively, only a portion (e.g., one or both the circumferential edges) of the radially inner peripheral surface 28A of the head portion 28U1-28W2 of the tooth 22U1-22W2 may be configured to generally extend along or contact the first imaginary line VL1 while the other part of the radially inner peripheral surface 28A is spaced apart from the first imaginary line VL1. That is, it is not necessary to extend the entire inner peripheral surface 28A along the first imaginary line VL1 as long as the head portion 28U1-28W2 of the tooth 22U1-22W2 is configured to extend generally parallel to the first imaginary line VL1.

Fourth Embodiment

Next, a fourth embodiment of the present invention will be described.

Figure 8:
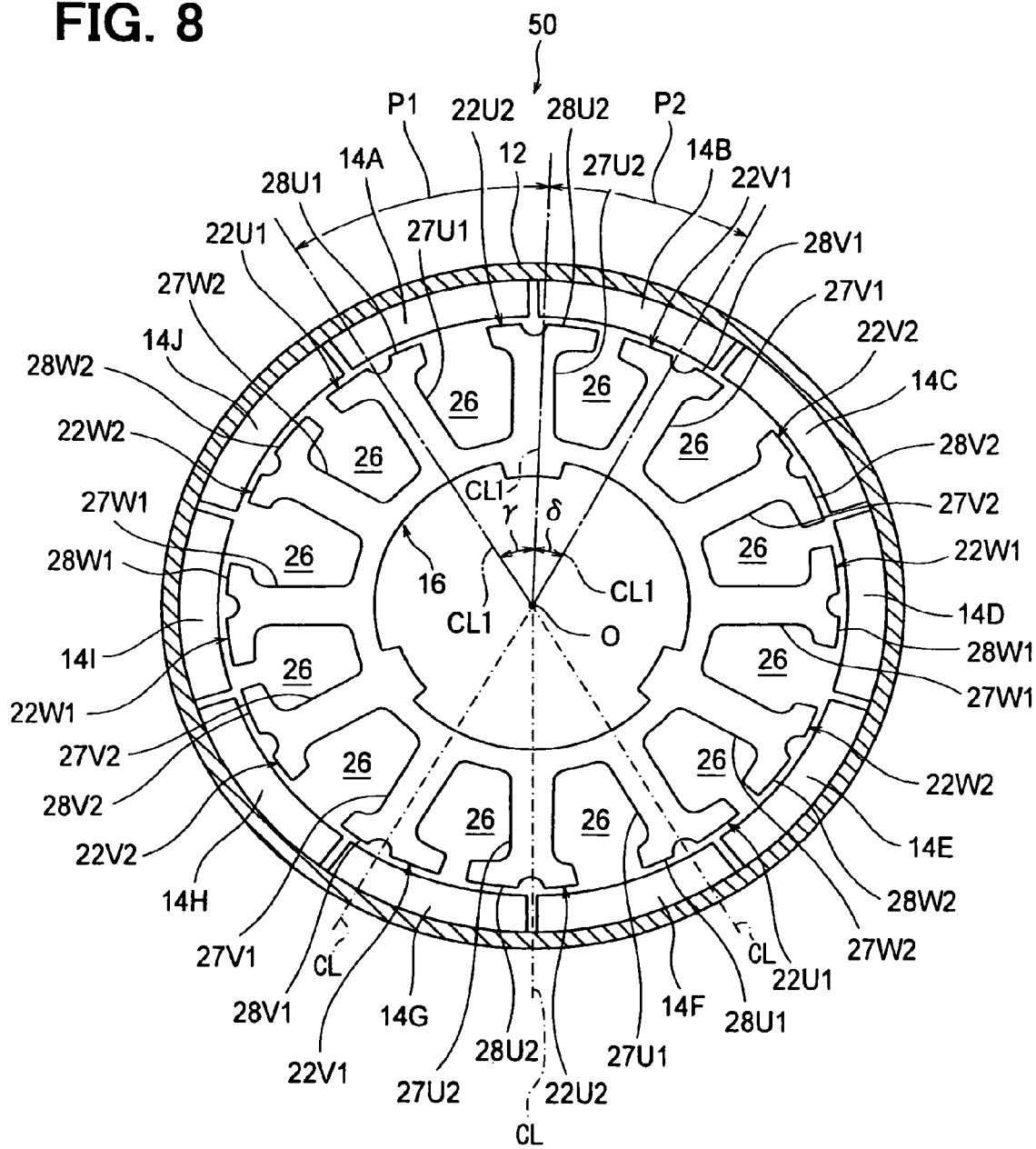
FIG. 8 is a cross sectional view of a brushless motor according to a fourth embodiment of the present invention.
Figure 9:
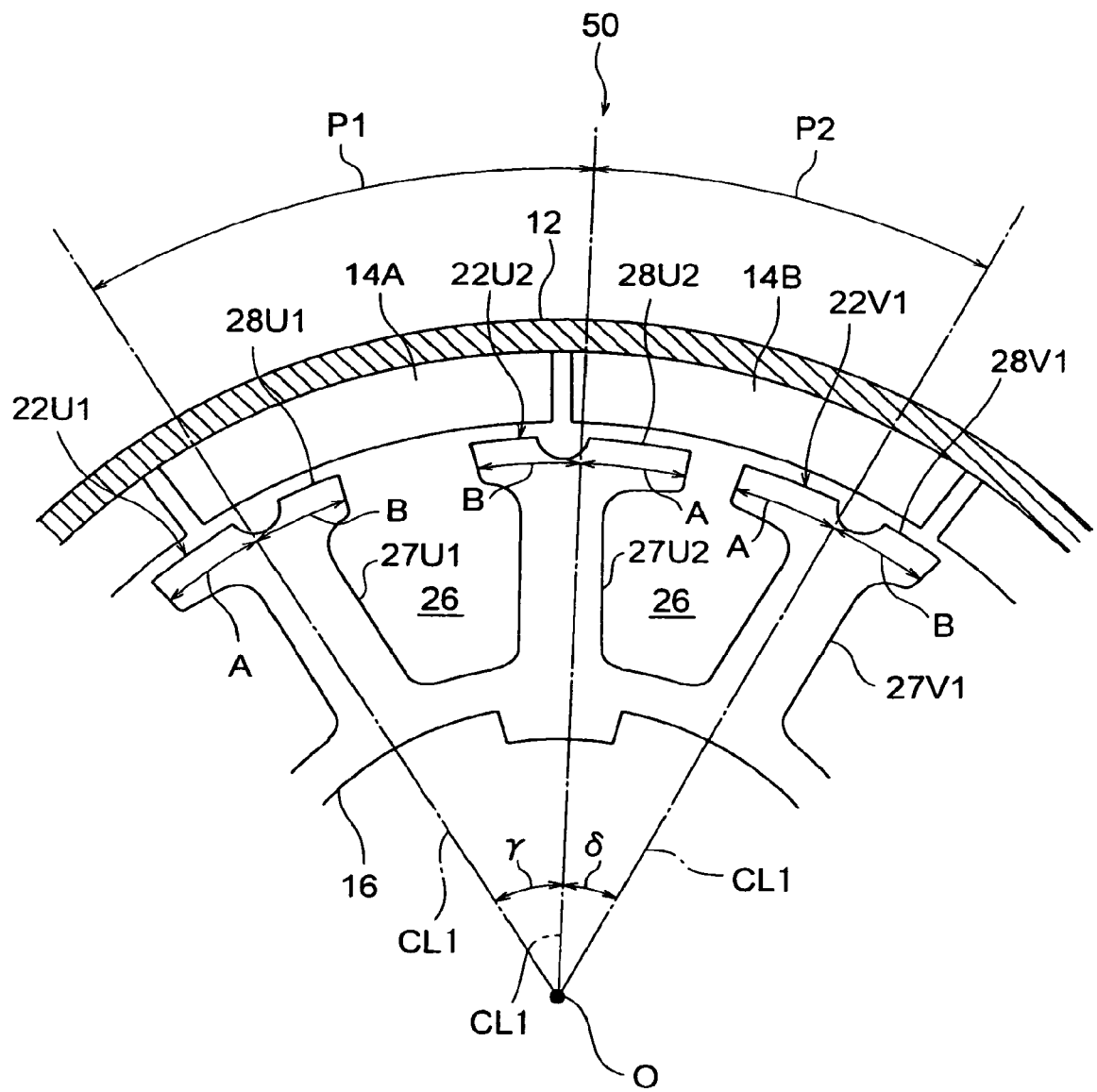
FIG. 9 is an enlarged partial cross-sectional view indicating a main feature shown in FIG. 8.

FIG. 8 is a cross-sectional view showing a cross section of a brushless motor 50 of the fourth embodiment along a plane that is perpendicular to an axial direction of the brushless motor 40. FIG. 9 is an enlarged partial cross-sectional view indicating a main feature shown in FIG. 8.

In FIGS. 8 and 9, the stator coils 18U1-18W2 wound around the teeth 22U1-22W2 are omitted for the sake of simplicity. These stator coils 18U1-18W2 are arranged in a manner similar to the stator coils 18U1-18W2 shown in FIG. 1.

The brushless motor 50 of the fourth embodiment is similar to the brushless motor 10 of the first embodiment except the following points.

Each of the teeth 22U1-22W2 includes the main body 27U1-27W2 and the head portion 28U1-28W2. The main body 27U1-27W2 is elongated in the radial direction, and the head portion 28U1-28W2 circumferentially projects from the radial end of the main body 27U1-27W2 in the clockwise direction and the counterclockwise direction and is radially opposed to the rotor magnets 14A-14J.

Furthermore, the main bodies 27U1-27W2 of the teeth 22U1-22W2 are arranged one after another in the circumferential direction at equal pitches. That is, the pitch, which is circumferentially measured as an angular interval (circumferential interval) between the center lines CL of the main bodies 27U1-27W2 of each adjacent two of the teeth 22U1-22W2, is constant for all of the teeth 22U1-22W2. In this instance, similar to the first embodiment, the center line CL of the main body 27U1-27W2 of each tooth 22U1-22W2, which extends through the circumferential center of the main body 27U1-27W2 over the length of the main body 27U1-27W2, extends along the corresponding imaginary radial line (overlapped with the center line CL in FIG. 8), which extends from the center O of the stator core 16 in the radial direction of the stator core 16. The head portions 28U1-28W2 of the teeth 22U1-22W2 are arranged one after another in the circumferential direction such that the first pitch P1 and the second pitch P2 are alternately defined one after another in the circumferential direction.

In this instance, as shown in FIG. 9, in each of the teeth 22U1-22W2, the line CL1, which connects the circumferential center of the head portion 28U1-28W2 of the tooth 22U1-22W2 between the opposed circumferential ends of the head portion 28U1-28W2 to the center O of the stator core 16, is defined as the center line of the head portion 28U1-28W2 (extending along the corresponding imaginary radial line). That is, a circumferential distance A between the one circumferential end of the head portion 28U1-28W2 of the tooth 22U1-22W2 and the center line CL1 of the head portion 28U1-28W2 is equal to a circumferential distance B between the other circumferential end of the head portion 28U1-28W2 of the tooth 22U1-22W2 and the center line CL1 of the head portion 28U1-28W2. The first pitch P1 and the second pitch P2 are determined with reference to these center lines CL1 of the head portions 28U1-28W2. Specifically, the first pitch P1 is defined as the angular interval (circumferential interval) between the center lines CL1 of the head portions 28U1-28W2 of the adjacent two of the teeth 22U1-22W2, which belong to the same common phase (the U-phase, the V-phase or the W-phase). The pitch P2 is defined as the angular interval (circumferential interval) between the center lines CL1 of the head portions 28U1-28W2 of the other adjacent two of the teeth 22U1-22W2, which belong to the different phases, respectively.

Furthermore, the central angle $\gamma$ of the first pitch P1 about the center of the stator core 16 satisfies a relationship of 360 degrees/n<$\gamma$≦360 degrees/m, where "m" denotes the number of the magnetic poles 24, and "n" denotes the number of the slots 26. Furthermore, the central angle $\gamma$ of the first pitch P1 about the center of the stator core 16 and the central angle $\delta$ of the second pitch P2 about the center of the stator core 16 satisfy a relationship of $\gamma+\delta=(360\ degrees/n)\times 2$.

That is, in the brushless motor 50 of the present embodiment, the relationship between the number of the magnetic poles 24 of the rotor magnets 14A-14J, which are arranged one after another in the circumferential direction, is ten, and the number of the slots 26, each of which is defined between the adjacent two of the teeth 22U1-22W2, is twelve. Therefore, the brushless motor 50 is formed as the 10-pole/12-slot electric motor. Thereby, the angle $\gamma$ is in the range of 30 degrees<$\gamma$≦36 degrees, and the angle $\delta$ is in the range of 30 degrees>$\delta$≧24 degrees.

Even with this construction, the phase difference $\Delta\theta$ (see FIGS. 3 and 5) between the phase of the electric current I, which flows through the stator coils 18U1-18W2 wound around the teeth 22U1-22W2, and the phase of the magnetic flux $\phi$, which is applied from the rotor magnets 14A-14J to the stator coils 18U1-18W2, becomes equal to or closer to 90 degrees in comparison to the case where the teeth 22U1-22W2 are arranged one after another at the equal pitches P in the circumferential direction (i.e., the case where the angle $\gamma$ and the angle $\delta$ are constant and are set to be 30 degrees, and the phase difference $\Delta\theta$ is 75 degrees, as shown in FIG. 10). As a result, the relatively high effective magnetic flux amount can be achieved, and thereby the relatively high motor efficiency can be achieved.

In the case of the 10-pole/12-slot brushless motor where the central angle $\gamma$ of the first pitch is 36 degrees, the phase difference $\Delta\theta$ between the phase of the electric current I, which flows through the stator coils 18U1-18W2 wound around the teeth 22U1-22W2, and the phase of the magnetic flux $\phi$, which is applied from the rotor magnets 14A-14J to the stator coils 18U1-18W2, becomes 90 degrees. Therefore, it is possible to improve the motor efficiency.

According to the present embodiment, in the case of the 10-pole/12-slot electric motor, the angle $\gamma$ satisfies the relationship of 360 degrees/n<$\gamma$≦360 degrees/m, and the angle $\gamma$ and the angle $\delta$ satisfy the relationship of $\gamma+\delta=(360\ degrees/n)\times 2$. Alternatively, the above concept may be applied to the 20-pole/24-slot electric motor.

The embodiment of the present invention has been described above. However, the present invention is not limited to the above embodiment, and the above embodiment may be modified in various ways without departing from the spirit and scope of the present invention.

In the above embodiments, each brushless motor 10, 30 is constructed as the outer rotor type, in which the rotor 11 is rotated at the location radially outward of the stator 15. Alternatively, each brushless motor may be constructed as an inner rotor type, in which the rotor 11 is rotated at the location radially inward of the stator 15.

What is claimed is:

1. A brushless motor comprising:
at least one rotor magnet that forms a plurality of alternating N and S magnetic poles, which are alternately arranged one after another in a circumferential direction at generally equal pitches;
a stator core that includes a plurality of teeth, which are opposed to the at least one rotor magnet in a radial direction of the stator core and are arranged one after another in the circumferential direction at alternating first and second pitches that are alternately provided in the circumferential direction, wherein the second pitch is smaller than the first pitch, and a slot is defined between each adjacent two of the plurality of teeth; and
a plurality of stator coils that are wound around the plurality of teeth and form a plurality of phases, wherein:
each corresponding adjacent two of the plurality of teeth, which are spaced from each other by the first pitch, are wound with corresponding two, respectively, of the plurality of stator coils, which form a corresponding common phase among the plurality of phases; and
each corresponding adjacent two of the plurality of teeth, which are spaced from each other by the second pitch, are wound with corresponding two, respectively, of the plurality of stator coils, which form corresponding different phases, respectively, among the plurality of phases.

2. The brushless motor according to claim 1, wherein:
each of the plurality of teeth includes an elongated main body and a head portion;
the main body of each of the plurality of teeth has a center line that extends through a circumferential center of the main body over a length of the main body along a corresponding imaginary radial line, which extends from a center of the stator core through the main body in the radial direction of the stator core;
the head portion of each of the plurality of teeth circumferentially extends from a radial distal end of the main body of the tooth in both of a clockwise direction and a counterclockwise direction;
each first pitch is a circumferential interval between the center lines of the main bodies of the corresponding adjacent two of the plurality of teeth; and
each second pitch is a circumferential interval between the center lines of the main bodies of the corresponding adjacent two of the plurality of teeth.

3. The brushless motor according to claim 1, wherein:
each of the plurality of teeth includes an elongated main body and a head portion;
the main body of each of the plurality of teeth has a center line, which extends through a circumferential center of the main body along a length of the main body and is angled relative to a corresponding imaginary radial line, which extends from a center of the stator core through the main body in the radial direction of the stator core;
the head portion of each of the plurality of teeth circumferentially extends from a radial distal end of the main body of the tooth in both of a clockwise direction and a counterclockwise direction and has a radially inner peripheral surface, at least a part of which generally extends along a first imaginary line of the tooth that crosses the center line of the main body at a crossing point in the tooth where a second imaginary line of the tooth, which radially extends from the center of the stator core along the corresponding imaginary radial line, crosses the first imaginary line of the tooth at a right angle;
each first pitch is a circumferential interval between the crossing points of the corresponding adjacent two of the plurality of teeth; and
each second pitch is a circumferential interval between the crossing points of the corresponding adjacent two of the plurality of teeth.

4. The brushless motor according to claim 3, wherein an angle between the center line of the main body and the second imaginary line in each of the plurality of teeth is larger than zero degrees and is equal to or smaller than eighteen degrees.

5. The brushless motor according to claim 3, wherein an angle between the center line of the main body and the second imaginary line in each of the plurality of teeth is about fifteen degrees.

6. The brushless motor according to claim 3, wherein a circumferential extent of a radially inner bottom of the slot, which is defined between the corresponding adjacent two teeth spaced from each other by the second pitch, is larger than a circumferential extent of a radially inner bottom of the slot, which is defined between the corresponding adjacent two teeth spaced from each other by the first pitch.

7. The brushless motor according to claim 3, wherein a circumferential distance between the head portions of the corresponding adjacent two of the plurality of teeth, which are spaced from each other by the first pitch, is generally equal to a circumferential distance between the head portions of the corresponding adjacent two of the plurality of teeth, which are spaced from each other by the second pitch.

8. The brushless motor according to claim 1, wherein:
each of the plurality of teeth includes an elongated main body and a head portion;
the main body of each of the plurality of teeth has a center line that extends through a circumferential center of the main body over a length of the main body along a corresponding imaginary radial line, which extends from a center of the stator core through the main body in the radial direction of the stator core;
the center lines of the main bodies of the plurality of teeth are arranged one after another in the circumferential direction at generally equal pitches;
the head portion of each of the plurality of teeth circumferentially extends from a radial distal end of the main body of the tooth in both of a clockwise direction and a counterclockwise direction and has a center line, which extends through a circumferential center of the head portion along a corresponding imaginary radial line that extends from the center of the stator core through the head portion in the radial direction of the stator core;
each first pitch is a circumferential interval between the center lines of the head portions of the corresponding adjacent two of the plurality of teeth; and
each second pitch is a circumferential interval between the center lines of the head portions of the corresponding adjacent two of the plurality of teeth.

9. The brushless motor according to claim 1, wherein:
a total number of the N and S magnetic poles and a total number of the slots are ten and twelve, respectively, or are twenty and twenty four, respectively;
a central angle of each first pitch is set to satisfy a relationship of 360 degrees/n<$\alpha \leqq$360 degrees/m where $\alpha$ denotes the central angle of the first pitch, and n denotes the total number of the slots, and m denotes the total number of the N and S magnetic poles; and
the central angle of each first pitch and a central angle of each second pitch are set to satisfy a relationship of $\alpha+\beta$=(360 degrees/n)×2 where $\beta$ denotes the central angle of the second pitch.

* * * * *